United States Patent
Park et al.

(10) Patent No.: US 11,520,738 B2
(45) Date of Patent: Dec. 6, 2022

(54) INTERNAL KEY HASH DIRECTORY IN TABLE

(71) Applicant: SAMSUNG ELECTRONICS CO., LTD., Suwon-si (KR)

(72) Inventors: Heekwon Park, Cupertino, CA (US); Ho bin Lee, San Jose, CA (US); Ilgu Hong, Santa Clara, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/837,730

(22) Filed: Apr. 1, 2020

(65) Prior Publication Data
US 2021/0089498 A1   Mar. 25, 2021

Related U.S. Application Data

(60) Provisional application No. 62/903,637, filed on Sep. 20, 2019.

(51) Int. Cl.
*G06F 7/00* (2006.01)
*G06F 16/14* (2019.01)
*G06F 16/2455* (2019.01)
*G06F 16/22* (2019.01)
*G06F 16/13* (2019.01)

(52) U.S. Cl.
CPC .......... *G06F 16/152* (2019.01); *G06F 16/137* (2019.01); *G06F 16/2255* (2019.01); *G06F 16/24558* (2019.01)

(58) Field of Classification Search
CPC ............ G06F 16/152; G06F 16/24558; G06F 16/2255; G06F 16/137; G06F 16/134; G06F 16/325; G06F 16/9014
See application file for complete search history.

(56) References Cited

U.S. PATENT DOCUMENTS

| | | | |
|---|---|---|---|
| 6,067,547 A * | 5/2000 | Douceur | G06F 16/2255 |
| 6,292,795 B1 | 9/2001 | Peters et al. | |
| 8,001,096 B2 | 8/2011 | Farber et al. | |
| 9,256,549 B2 * | 2/2016 | Kimmel | G06F 3/0688 |
| 9,965,482 B2 | 5/2018 | Yochai | |
| 9,971,526 B1 * | 5/2018 | Wei | G06F 3/0619 |
| 10,437,804 B1 * | 10/2019 | Tsypliaev | G06F 16/2255 |
| 10,474,656 B1 * | 11/2019 | Bronnikov | G06F 16/217 |
| 11,100,071 B2 * | 8/2021 | Tomlinson | G06F 16/2246 |
| 2007/0011734 A1 * | 1/2007 | Balakrishnan | H04L 43/026 726/13 |

(Continued)

*Primary Examiner* — Mohammed R Uddin
(74) *Attorney, Agent, or Firm* — Lewis Roca Rothgerber Christie LLP (57) ABSTRACT

Provided is a system and method for searching for a target key in a database, the method including populating a hash-offset table of a sorted key table with hash-offset table entries, the hash-offset table entries having a hash-value corresponding to a respective key, and a hash offset, sorting the hash-offset table entries based on the hash-values, searching for a target hash-value of the hash-values corresponding to a target key in the hash-offset table, locating a target key-value pair corresponding to the target key based on the target hash-value, and saving a location of the target key-value pair.

21 Claims, 4 Drawing Sheets

(56) References Cited

U.S. PATENT DOCUMENTS

| | | | |
|---|---|---|---|
| 2011/0145260 A1* | 6/2011 | Ichino | G06F 16/9014 |
| | | | 707/747 |
| 2011/0270820 A1* | 11/2011 | Agarwal | G06F 40/253 |
| | | | 707/709 |
| 2011/0276744 A1 | 11/2011 | Sengupta et al. | |
| 2012/0143877 A1* | 6/2012 | Kumar | G06F 16/9014 |
| | | | 707/747 |
| 2013/0042060 A1* | 2/2013 | Marukame | G06F 12/0246 |
| | | | 711/108 |
| 2014/0297651 A1* | 10/2014 | Shadmon | G06F 16/2228 |
| | | | 707/741 |
| 2014/0301394 A1* | 10/2014 | Arad | G06F 16/214 |
| | | | 370/392 |
| 2014/0304472 A1 | 10/2014 | Colgrove et al. | |
| 2016/0342482 A1 | 11/2016 | Aronovich et al. | |
| 2016/0350302 A1* | 12/2016 | Lakshman | G06F 16/9014 |
| 2017/0192892 A1* | 7/2017 | Pundir | G06F 12/0873 |
| 2017/0250708 A1* | 8/2017 | Blaettler | G06F 3/0608 |
| 2018/0011852 A1* | 1/2018 | Bennett | G06F 16/2255 |
| 2018/0225322 A1* | 8/2018 | Boles | G06F 16/9027 |
| 2019/0034427 A1* | 1/2019 | Trika | G06F 16/21 |
| 2019/0095490 A1* | 3/2019 | Colgrove | G06F 16/2455 |
| 2021/0124522 A1* | 4/2021 | Sun | G06F 3/0638 |
| 2021/0248107 A1* | 8/2021 | Hou | G06F 12/0246 |

\* cited by examiner

INTERNAL KEY HASH DIRECTORY IN TABLE

CROSS-REFERENCE TO RELATED APPLICATION(S)

This application claims priority to, and the benefit of, U.S. Provisional Application Ser. No. 62/903,637, filed Sep. 20, 2019, entitled Internal Key Hash Directory In Table, the contents of which are incorporated herein in their entirety.

FIELD

One or more aspects of embodiments of the present disclosure relate generally to data storage.

BACKGROUND

Searching for and retrieving a random key in a table in a key-value (KV) store may result in critical overhead. Such overhead is generally due to the search utilizing multiple key comparisons. Accordingly, some key searching techniques may generally uses a large number of CPU cycles associated with the various key comparisons. Therefore, it may be useful to more efficiently and effectively define a table's data structure.

SUMMARY

Embodiments described herein provide improvements to data storage by mapping a hash-offset table to a key-value table.

According to one embodiment of the present disclosure, there is provided a method of searching for a target key in a database, the method including populating a hash-offset table of a sorted key table with hash-offset table entries, the hash-offset table entries having a hash-value corresponding to a respective key, and a hash offset, sorting the hash-offset table entries based on the hash-values, searching for a target hash-value of the hash-values corresponding to a target key in the hash-offset table, locating a target key-value pair corresponding to the target key based on the target hash-value, and saving a location of the target key-value pair.

Searching the target hash-value may include performing a binary search.

The method may further include calculating the target hash-value from the target key.

Saving the location of the target key-value pair may include mapping the target hash-value to the target key-value pair.

Locating the target key-value pair may include locating the target key-value pair based on the hash offset.

The sorted key table may further include a key-value table including a plurality of key-value table entries, the key-value table entries including the target key-value pair.

A number of the key-value table entries may be the same as a number of the hash-offset table entries.

According to another embodiment of the present disclosure, there is provided a system for searching for a target key in a database, the system including an on-memory data structure, a storage format data structure, and a storage device, wherein the system is configured to populate a hash-offset table of a sorted key table with hash-offset table entries in the storage format data structure, the hash-offset table entries having a hash-value corresponding to a respective key, and a hash offset, sort the hash-offset table entries based on the hash-values in accordance with an on-memory sorting structure of the on-memory data structure, search the on-memory data structure or the storage format data structure for a target hash-value of the hash-values corresponding to a target key in the hash-offset table, locate a target key-value pair corresponding to the target key based on the target hash-value in the on-memory data structure or the storage format data structure, and save a location of the target key-value pair to the on-memory data structure or the storage format data structure.

The system may be further configured to search the target hash-value by performing a binary search.

The system may be further configured to calculate the target hash-value from the target key.

The system may be further configured to save the location of the target key-value pair by mapping the target hash-value to the target key-value pair.

The system may be further configured to locate the target key-value pair by locating the target key-value pair based on the hash offset.

The sorted key table may further include a key-value table including a plurality of key-value table entries, the key-value table entries including the target key-value pair.

According to yet another embodiment of the present disclosure, there is provided a non-transitory computer readable medium implemented on a system for searching for a target key in a database, the non-transitory computer readable medium having computer code that, when executed on a processor, implements a method of data storage, the method including populating a hash-offset table of a sorted key table with hash-offset table entries, the hash-offset table entries having a hash-value corresponding to a respective key, and a hash offset, sorting the hash-offset table entries based on the hash-values, searching for a target hash-value of the hash-values corresponding to a target key in the hash-offset table, locating a target key-value pair corresponding to the target key based on the target hash-value, and saving a location of the target key-value pair.

The computer code, when executed by the processor, may further implement the method of data storage by searching the target hash-value by performing a binary search.

The computer code, when executed by the processor, may further implement the method of data storage by calculating the target hash-value from the target key.

Saving the location of the target key-value pair may include mapping the target hash-value to the target key-value pair.

Locating the target key-value pair may include locating the target key-value pair based on the hash offset.

The sorted key table may further include a key-value table including a plurality of key-value table entries, the key-value table entries including the target key-value pair.

A number of the key-value table entries may be the same as a number of the hash-offset table entries.

Accordingly, the system of embodiments of the present disclosure is able to improve by data storage by providing a system and method for improved searching and retrieval of data by mapping entries of a hash-offset table to entries of a key-value table.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present disclosure may reduce or obviate the need for a search hierarchy and/or algorithm in an internal key hash directory to perform a search for key-value data (e.g., in a key-value solid state drive (KVSSD), such as KVRocks). Accordingly, the disclosed embodiments are able to reduce a number of CPU cycles of a processor of a KVSSD that are used for locating a random key in given table stored in the KVSSD.

The internal key hash directory of the disclosed embodiments includes various entries that have both a hash-value of a corresponding key and an offset in a hash-offset table. Accordingly, the internal key hash directory's key-value table entries are able to be sorted based on their respective hash-value. Therefore, when searching for a random key, because each key has been converted to a corresponding hash-value, and because a size of the hash-value will be smaller than a size of the key to which it corresponds, embodiments of the present disclosure are able to reduce overhead by searching for the hash-value corresponding to the sought-after target key in the internal key hash directory.

Figure 1:
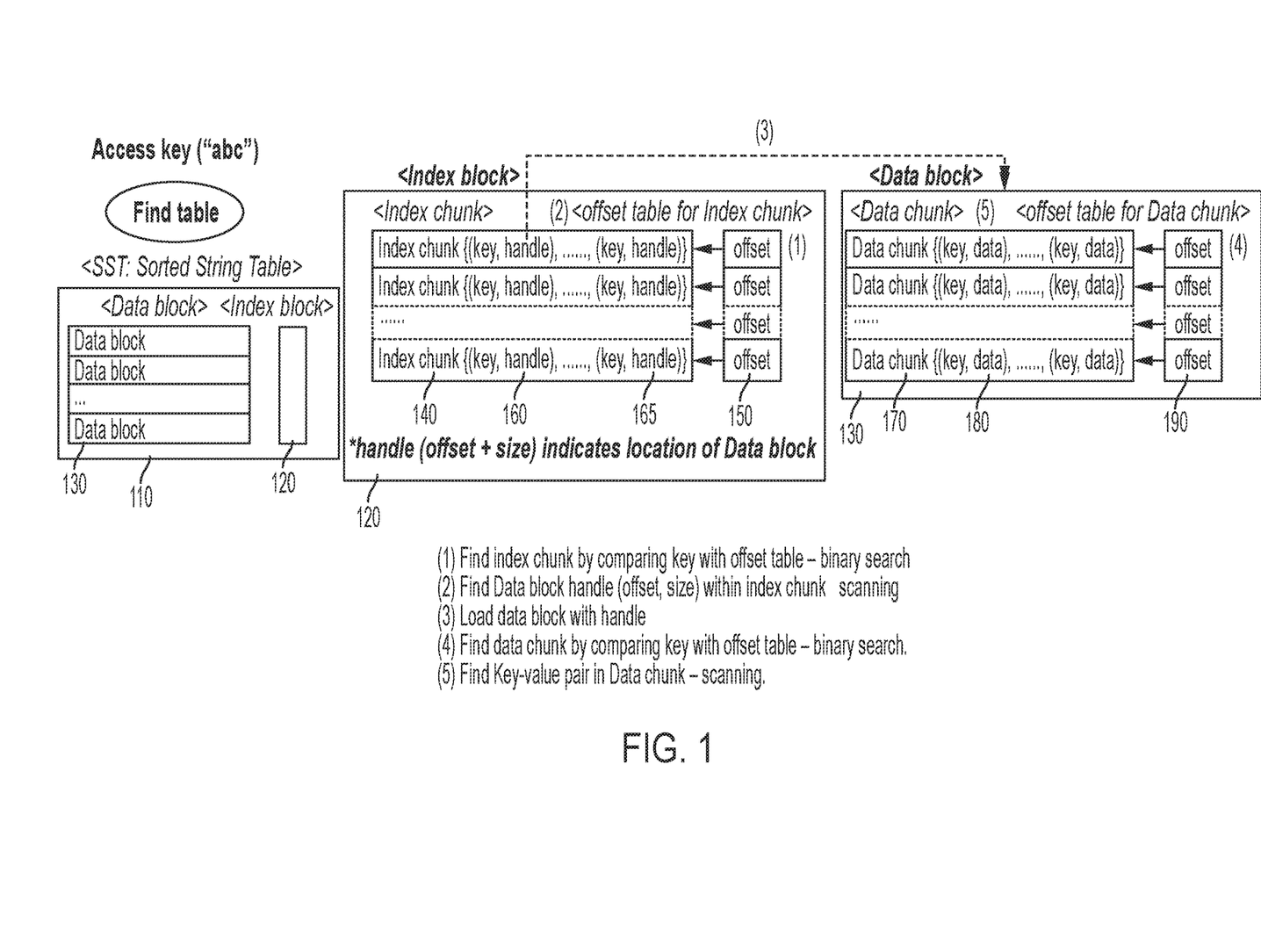
FIG. 1 is a block diagram depicting an example of a search hierarchy of a sorted string table.

FIG. 1 is a block diagram depicting an example of a search hierarchy of a sorted string table.

Referring to FIG. 1, a sorted string table (SST) 110 may be the primary on-storage data format for saving key information. Further, some log-structured KV databases, such as RocksDB, developed by FACEBOOK®, and LevelDB, developed by GOOGLE®, include a relatively complex search hierarchy, or search algorithm, inside the SST 110 in the KV storage. The search hierarchy may be considered as a general order of operations followed when data corresponding to a target key is searched for such that the data can be returned to an application requesting the search. It should be noted that a single key search in a SST 110 may be a path in a random access pattern.

For example, to search for and to locate a KV pair 180, some search algorithms, such as that used in a LevelDB table structure including index blocks 120 and data blocks 130, may first locate an index chunk 140 handle from an index block 120. Then, an index chunk 140 may be located using the index chunk 140 handle. The index chunk 140 may be located by comparing the relevant key with an offset table 150 (e.g., by performing a binary search). That is, some search algorithms may search for the index chunk 140 by performing a binary search with the offset table 150.

Once the index chunk 140 is located, the search algorithm may then similarly locate the data block handle 160 that is included in the index chunk 140 by performing a scanning operation. The data block handle 160 includes offset and size, and thereby indicates the location of the relevant data block 130.

Then the search algorithm may load the relevant data block 130 by using the data block handle 160.

Additionally, the search algorithm may seek to locate a data chunk 170 that is in the data block 130 and that has the sought-after target key-value data/KV pair 180 (e.g., corresponding to target key "abc") by performing a binary search with an offset table 190 in the data block 130. Thereafter, the search algorithm performs a scanning operation to scan the KV pair 180 to locate the KV pair 180 in the data chunk 170.

Accordingly, the structure described above performs at least two binary searches and two scans using a string compare operation to obtain the target KV pair 180. Therefore, it may be advantageous to provide a format that supports a faster single query.

Figure 2:
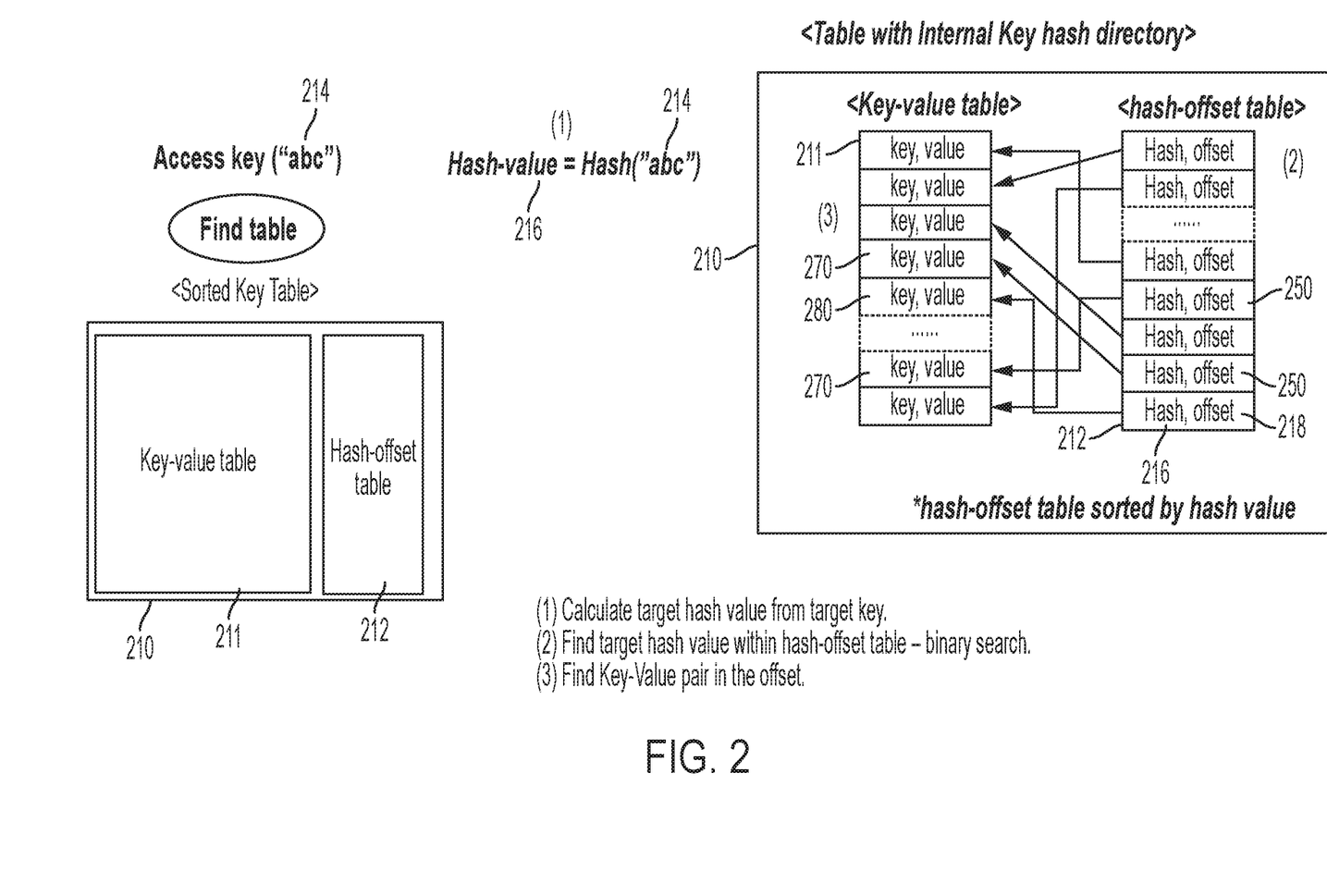
FIG. 2 is a block diagram depicting a method of searching for a key-value pair according to embodiments of the present disclosure.

FIG. 2 is a block diagram depicting a method of searching for a key-value pair according to embodiments of the present disclosure.

Referring to FIG. 2, an example method in accordance with embodiments of the present disclosure may proceed generally as follows.

Initially, a system of embodiments of the present disclosure may access a table (e.g., a sorted key table) 210 including a sought-after key, or target key, of a key-value (KV) pair 280. A KV pair 280 corresponds to a key for identifying stored data, and to a value, or object, including the data. The sought-after/target key may be the key that is searched for by the system during a key search, as described further below. The table may include a KV table 211 and a hash-offset table 212 (e.g., an internal key hash directory). The various keys 214 of the KV pairs 280 of the database may be separated into one or more respective KV tables 211, and each of the KV tables 211 may correspond to a respective hash-offset table 212 to enable the keys 214 of the KV table(s) 211 to be located during a search.

Thereafter, the system may perform a search for a given target key 214. In the present example, the system is searching for key "abc." Accordingly, the system may initially calculate a target hash-value 216 by hashing the target key 214 (e.g., by determining the target hash-value 216 corresponding to the target key 214, for example, according to the equation "target hash-value=Hash("abc")"). For example, the hash-value 216 may be calculated from strings of keys 214. Accordingly, the number of separate instances of hash information may be the same as the number of keys 214 respectively corresponding thereto. For example, the sorted key table may populate the hash-offset table 212 with the same number of hash-offset table entries 250 as the number of key-value table entries 270 in the KV table 211, and then after calculating the hash-values 216, the system may sort the hash-offset table 212 by the hash-values 216.

Furthermore, an offset of the actual location of the corresponding KV pair 280 can be included for each hash-value 216 (e.g., by using each key 214, the system may create the corresponding hash-values 216). Accordingly, when the system builds the metadata, the hash-value 216 may be saved to some location in the KVSSD, and the key entries 270 may be mapped to the hash-offset table entries 250.

Then, the system may perform a binary search by searching the target hash-value 216 within the hash-offset table 212. Hash-offset table entries 250 of the hash-offset table 212 may be sorted based on their respective hash-value 216, and each hash offset 218 for locating the corresponding KV pair 280 in a corresponding key entry 270 is located in the hash-offset table 212.

After locating the hash offset 218 corresponding to the KV pair 280 of the target key 214, the system retrieves the KV pair 280 from the hash offset 218 in the buffer. Accordingly, if a random target key 214 is sought (e.g., key "abc"), the system may then calculate the hash corresponding thereto to determine a hash number/hash-value 216 (e.g., according to the equation "hash=Hash("abc")"), and may then search the hash-value 216 in the hash-offset table 212 by performing a binary search. In this case, the system has obtained the hash offset 218, and has determined that the hash offset 218 points to some location to locate the key 214.

For a random string of keys 214, there is generally a large amount of associated data. As described above, and according to the disclosed embodiments, the keys 214 can be split into separate key-value table entries 270 in a sorted key table 210. Thereafter, the sorted key table 210 includes a KV table 211 and a hash-offset table 212. By searching hash-value 216 in hash-offset table 212, the system can locate a target KV pair 280 with relatively fewer CPU cycles as compared with the example shown in FIG. 1.

In the disclosed embodiments, the hash-values 216 dedicate a relatively small amount of data, and all keys 214 convert to, or can be mapped to, a corresponding hash-value 216. Because comparing each key 214 is more computationally expensive than comparing a hash-value 216 corresponding thereto, the system of the disclosed embodiment may be quicker, smaller, and more effective than the example shown in FIG. 1. That is, as described above, the internal key hash directory in a sorted key table according to embodiments of the present disclosure is more efficient, because there may be a reduced need or no need for a search hierarchy in an internal key hash directory. Therefore, a number of CPU cycles associated with locating a key in a table in the KV storage is reduced.

Figure 3:
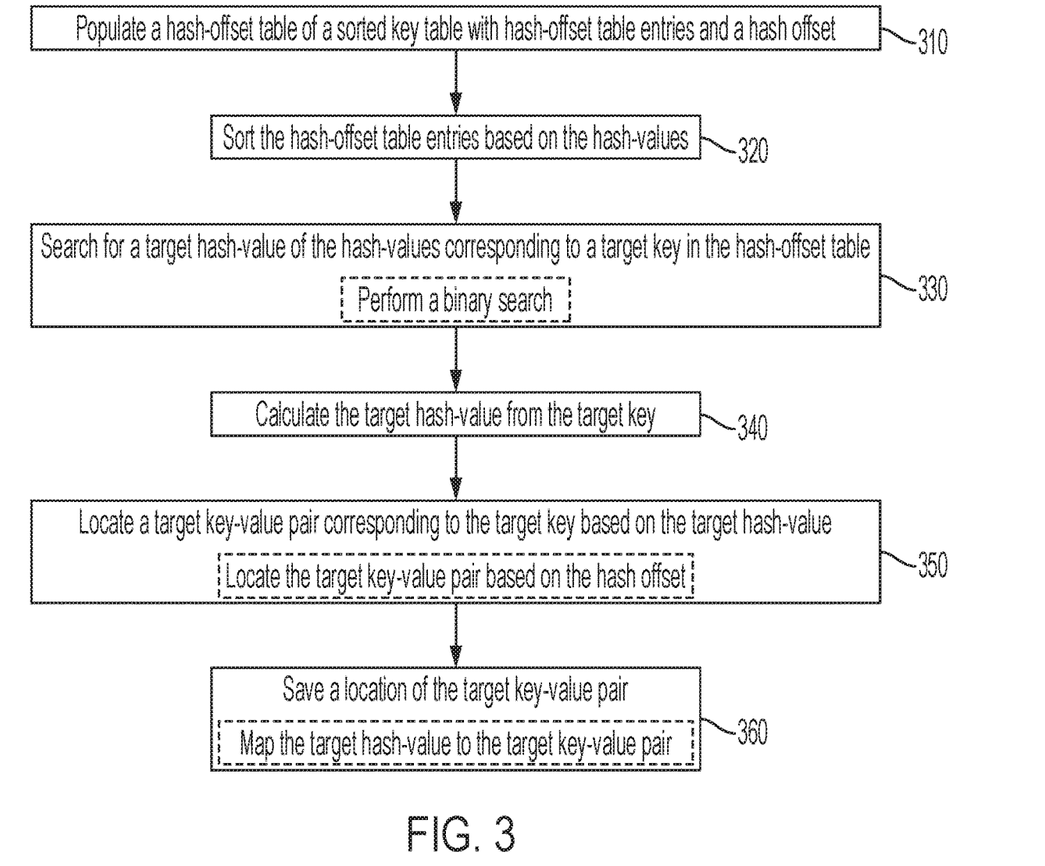
FIG. 3 is a flowchart depicting a method of searching for a key-value pair according to embodiments of the present disclosure.
Figure 4:
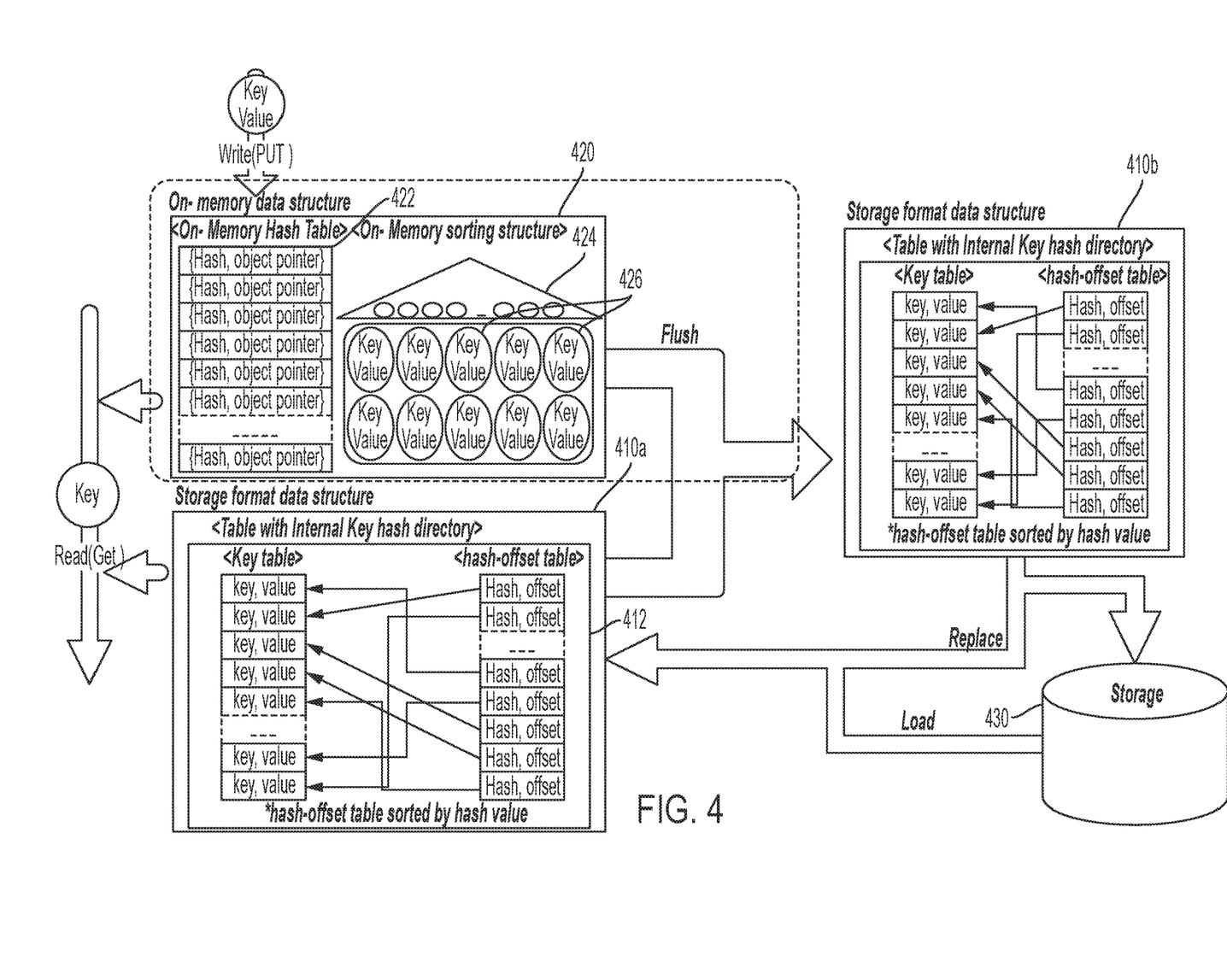
FIG. 4 is a block diagram depicting a system for searching for a key-value pair according to embodiments of the present disclosure.

FIG. 3 is a flowchart depicting a method of searching for a key-value pair according to embodiments of the present disclosure. FIG. 4 is a block diagram depicting a system for searching for a key-value pair according to embodiments of the present disclosure.

Referring to FIGS. 3 and 4, a method of searching for a key-value pair may include populating a hash-offset table of a sorted key table with hash-offset table entries and a hash offset (310) (e.g., in a storage format data structure 410). The hash-offset table entries may have a hash-value corresponding to a respective key. The sorted key table my include a key-value table including a plurality of key-value table entries, the key-value table entries including the key-value pair. A number of the key-value table entries may be the same as a number of the hash-offset table entries.

The method may further include sorting the hash-offset table entries based on the hash-values (320).

The method may further include searching for a target hash-value of the hash-values corresponding to a target key in the hash-offset table (330). Searching for the target hash value may include performing a binary search.

The method may further include calculating the target hash-value from the target key (340).

The method may further include locating a target key-value pair corresponding to the target key based on the target hash-value (350). Locating the target key-value pair may include locating the target key-value pair based on the hash offset.

The method may further include saving a location of the target key-value pair (360). Saving the location of the target key-value pair may include mapping the target hash-value to the target key-value pair.

FIG. 4 is a block diagram depicting a system for searching for a key-value pair according to embodiments of the present disclosure.

Referring to FIG. 4, an on-memory data structure 420 generally relates to internal key hash directory creation and life cycle. It may be noted that the specifics regarding internal workings of the on-memory data structure 420 are not particularly relevant to the embodiments of the present disclosure. The on-memory data structure 420 includes a hash map, or an on-memory hash table 422, and an on-memory sorting structure 424. The on-memory data structure 420 initially manages on-memory key-value objects 426.

When the on-memory data structure 420 causes a flush happen, such that any logged key-values 426 may be marked for deletion to free up memory space, the on-memory data structure 420 may merge or create a storage format data structure 410 including an internal key hash directory 412. For example, the on-memory data structure 420 may be merged with a preexisting storage format data structure 410a. The merging or creation of the storage format data structure 410 corresponds to the flowchart of FIG. 3 (e.g., populating and sorting the hash-offset table, searching for and calculating the target hash-value, and locating and saving a location of the target key-value pair).

Thereafter, the newly created or newly merged storage format data structure 410b replaces any existing storage format data structure 410a, and is saved on a storage device 430.

Furthermore, any Read(get) operation will cause the on-memory data structure 420 to be initially searched, as the on-memory data structure 420 may have the latest relevant key-value pair 426. If the on-memory data structure 420 does not have the latest relevant key-value pair 426, the storage format data structure 410 may be searched for the key-value pair 426.

Accordingly, the disclosed embodiments provide a storage data format for enabling fast single key query for a key-value database system, thereby enabling relatively fast key location for a single key in a sorted key table by simplifying a search hierarchy thereof, and enabling the reduction of comparison overhead, thus improving single key read performance.

What is claimed is:

1. A method of searching for a target key in a database, the method comprising:
   populating, on a storage device, a hash-offset table of a sorted key table with hash-offset table entries, the hash-offset table entries having a hash-value corresponding to a respective key, and a hash offset;
   sorting the hash-offset table entries based on the hash-values;
   searching for a target hash-value of the hash-values corresponding to a target key in the hash-offset table;
   locating a target key-value pair corresponding to the target key based on the target hash-value; and
   saving a location of the target key-value pair.

2. The method of claim 1, wherein searching the target hash-value comprises performing a binary search.

3. The method of claim 1, further comprising calculating the target hash-value from the target key.

4. The method of claim 1, wherein saving the location of the target key-value pair comprises mapping the target hash-value to the target key-value pair.

5. The method of claim 1, wherein locating the target key-value pair comprises locating the target key-value pair based on the hash offset.

6. The method of claim 1, wherein the sorted key table further comprises a key-value table comprising a plurality of key-value table entries, the key-value table entries comprising the target key-value pair.

7. The method of claim 6, wherein a number of the key-value table entries is identical to a number of the hash-offset table entries.

8. The method of claim 1, wherein the hash-value is smaller than the respective key.

9. A system for searching for a target key in a database, the system comprising an on-memory data structure, a storage format data structure, and a storage device, wherein the system is configured to:
   populate a hash-offset table of a sorted key table with hash-offset table entries in the storage format data structure on the storage device, the hash-offset table entries having a hash-value corresponding to a respective key, and a hash offset;

sort the hash-offset table entries based on the hash-values in accordance with an on-memory sorting structure of the on-memory data structure;

search the storage format data structure for a target hash-value of the hash-values corresponding to a target key in the hash-offset table;

locate a target key-value pair corresponding to the target key based on the target hash-value in the storage format data structure; and save a location of the target key-value pair to the storage format data structure.

10. The system of claim 9, wherein system is further configured to search the target hash-value by performing a binary search.

11. The system of claim 9, wherein the system is further configured to calculate the target hash-value from the target key.

12. The system of claim 9, wherein the system is further configured to save the location of the target key-value pair by mapping the target hash-value to the target key-value pair.

13. The system of claim 9, wherein the system is further configured to locate the target key-value pair by locating the target key-value pair based on the hash offset.

14. The system of claim 9, wherein the sorted key table further comprises a key-value table comprising a plurality of key-value table entries, the key-value table entries comprising the target key-value pair.

15. A non-transitory computer readable medium implemented on a system for searching for a target key in a database, the non-transitory computer readable medium having computer code that implements a method of data storage, the method comprising:

populating, on a storage device, a hash-offset table of a sorted key table with hash-offset table entries, the hash-offset table entries having a hash-value corresponding to a respective key, and a hash offset;

sorting the hash-offset table entries based on the hash-values;

searching for a target hash-value of the hash-values corresponding to a target key in the hash-offset table;

locating a target key-value pair corresponding to the target key based on the target hash-value; and saving a location of the target key-value pair.

16. The non-transitory computer readable medium of claim 15, wherein the computer code further implements the method of data storage by searching the target hash-value by performing a binary search.

17. The non-transitory computer readable medium of claim 15, wherein the computer code further implements the method of data storage by calculating the target hash-value from the target key.

18. The non-transitory computer readable medium of claim 15, wherein saving the location of the target key-value pair comprises mapping the target hash-value to the target key-value pair.

19. The non-transitory computer readable medium of claim 15, wherein locating the target key-value pair comprises locating the target key-value pair based on the hash offset.

20. The non-transitory computer readable medium of claim 15, wherein the sorted key table further comprises a key-value table comprising a plurality of key-value table entries, the key-value table entries comprising the target key-value pair.

21. The non-transitory computer readable medium of claim 20, wherein a number of the key-value table entries is identical to a number of the hash-offset table entries.

* * * * *